United States Patent [19]

Bader

[11] Patent Number: 5,095,863
[45] Date of Patent: Mar. 17, 1992

[54] IGNITION DISTRIBUTOR FOR INTERNAL COMBUSTION ENGINES

[75] Inventor: Walter Bader, Gartringen, Fed. Rep. of Germany

[73] Assignee: Robert Bosch GmbH, Stuttgart, Fed. Rep. of Germany

[21] Appl. No.: 679,033

[22] PCT Filed: Nov. 11, 1989

[86] PCT No.: PCT/DE89/00708
 § 371 Date: May 15, 1991
 § 102(e) Date: May 15, 1991

[87] PCT Pub. No.: WO90/05850
 PCT Pub. Date: May 31, 1990

[30] Foreign Application Priority Data

Nov. 15, 1988 [DE] Fed. Rep. of Germany ....... 8814267

[51] Int. Cl.⁵ .................................. F02P 1/00
[52] U.S. Cl. ........................ 123/146.5 A; 200/19 R; 200/19 DR; 200/19 DC
[58] Field of Search ............... 123/146.5 A, 146.5 R; 200/19 DC, 304 DC144 R, 190 R, 19 R, 19 DR

[56] References Cited

U.S. PATENT DOCUMENTS

| 4,639,560 | 1/1987 | Kronberger | 200/19 R |
| 4,719,883 | 1/1988 | Yokoyama et al. | 200/19 R |
| 4,793,298 | 10/1988 | Arano et al. | 200/19 DC |
| 4,808,934 | 2/1989 | Yokoyama et al. | 123/146.5 A |
| 4,858,586 | 8/1989 | Kanno | 123/146.5 A |
| 4,903,673 | 2/1990 | Chiba et al. | 123/146.5 A |
| 4,907,563 | 3/1990 | Kodama | 123/146.5 A |
| 4,919,106 | 4/1990 | Kodama et al. | 123/146.5 A |
| 4,941,450 | 7/1990 | Matsumura et al. | 123/146.5 A |
| 4,960,099 | 10/1990 | Shigrada et al. | 123/146.5 A |
| 5,028,868 | 7/1991 | Murada et al. | 123/146.5 A |

Primary Examiner—Raymond A. Nelli
Attorney, Agent, or Firm—Edwin E. Greigg; Ronald E. Greigg

[57] ABSTRACT

An ignition distributor for internal combustion engines having a distributor ring provided in the form of a diaphragm spring. The diaphragm spring comprises at least two perforated discs internally. The shielding cap and bush are grounded to the ignition distributor housing via plastic deformation of the bush to complementally configure same to the diaphragm spring. The shielding cap and distributor cap are held onto the distributor housing via at least two cap screws, the screws securing the bushes to the housing, and an undetachable contact is effected between the bush and the perforated disc by such plastic deformation.

5 Claims, 1 Drawing Sheet

IGNITION DISTRIBUTOR FOR INTERNAL COMBUSTION ENGINES

BACKGROUND OF THE INVENTION

The invention relates to improvements in ignition distributor for internal combustion engines. The shielding of the ignition distributor is provided only when there is a perfectly conducting connection of the shielding cap to the grounded vehicle chassis. There is already known from German Utility Model No. 8,515,918.2 an ignition distributor in which there is inserted at each screwing in point at which the shielding cap is connected to the distributor cap and the latter is connected to the housing of the ignition distributor and thus to the vehicle chassis, a disc whose outer region is injected into the shielding cap and whose interior has internal teeth produced by stamping and projecting conically from the plane of the distributor ring. The grounding of the shielding cap to the housing of the ignition distributor takes place when, upon mounting the distributor cap, the screw head in each case brings the inner part of the disc to bear on one flat end face of the bush, and clamps it there. The known ignition distributor thus comprises in two parts, and it would be necessary to plan an additional operation during the final assembly, it being necessary to pay heed to exact seating of the shielding cap on the distributor cap, to the correct assignment of the discs to the bushes, and to clean surfaces, in order for a perfect grounding to take place.

OBJECTS AND SUMMARY OF THE INVENTION

It is a principal object of the ignition distributor according to the invention to provide the advantage that the distributor ring consists of a simpler disc in the form of a diaphragm spring, which is constructed as a flat disc in its internal region, and thus no longer has segments. The grounding between the shielding cap and bush, and thus to the ignition distributor housing is achieved by partial plastic deformation of the correspondingly configured bush with the interior of the diaphragm spring. In this way, an exactly fixed connection with very good grounding is achieved, especially if the plastic deformation is done in a point-like fashion and a high contact reliability is achieved via the high surface pressure thus attained.

BRIEF DESCRIPTION OF THE DRAWINGS

The invention is represented in the drawing with reference to two figures, and explained in more detail in the following description.

DETAILED DESCRIPTION

Figure 1:
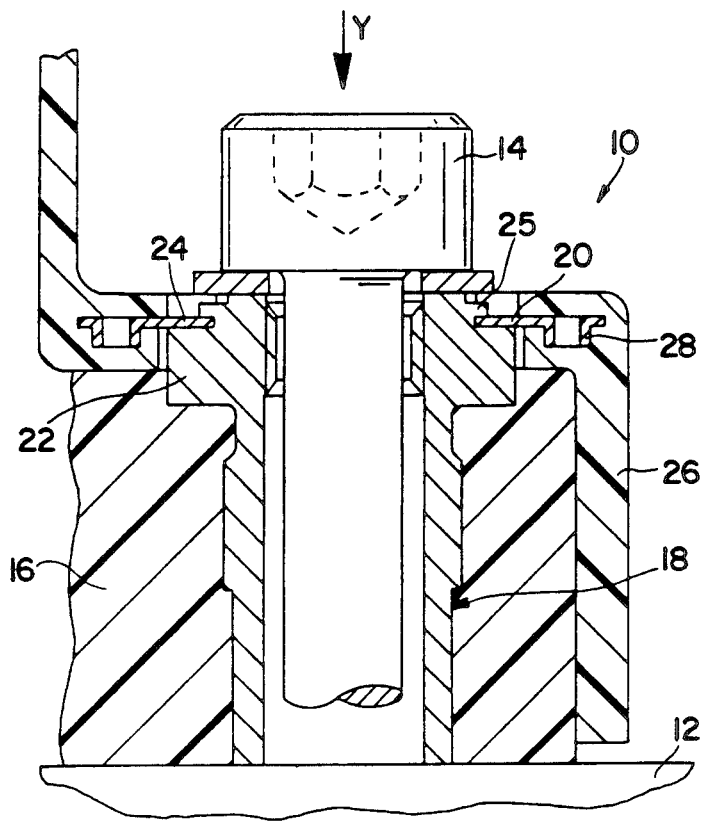
FIG. 1 shows a longitudinal section through a part of an ignition distributor.

Represented in the drawing in FIG. 1 is a partial section through an ignition distributor 10, on the housing 12 of which a distributor cap 16 is fixed with a plurality of head screws 14. In the region of each screw passage, the distributor cap 16, which is made of plastic, has a cylindrical bush 18, which is connected as an insert in a form-locking fashion to the distributor cap, which is produced by plastic injection. On its one end face, which faces the head of the assigned head screw, the bush 18 bears in a radial extension a collar 22, provided with a shoulder 20, on which the internal section of a diaphragm spring constructed as a disc 24 bears and is covered by a step 25 in the collar 22. The external section of the disc 24 is connected as an insert in a form-locking fashion to a shielding cap 26, produced by plastic injection, which covers the distributor cap 16. In its outer region, the disc 24 has six projections 28, which are produced by stamping holes therethrough; the projections have axes extending approximately perpendicular to the base surface of the disc 24. The disc 24 is fixed securely in the shielding cap 26 with these projections 28. Underneath the collar 22, in the region of the cylinder shaft, the bush 18 has a second collar, via which, in turn, a form-locking connection is produced with the distributor cap 16.

Figure 2:
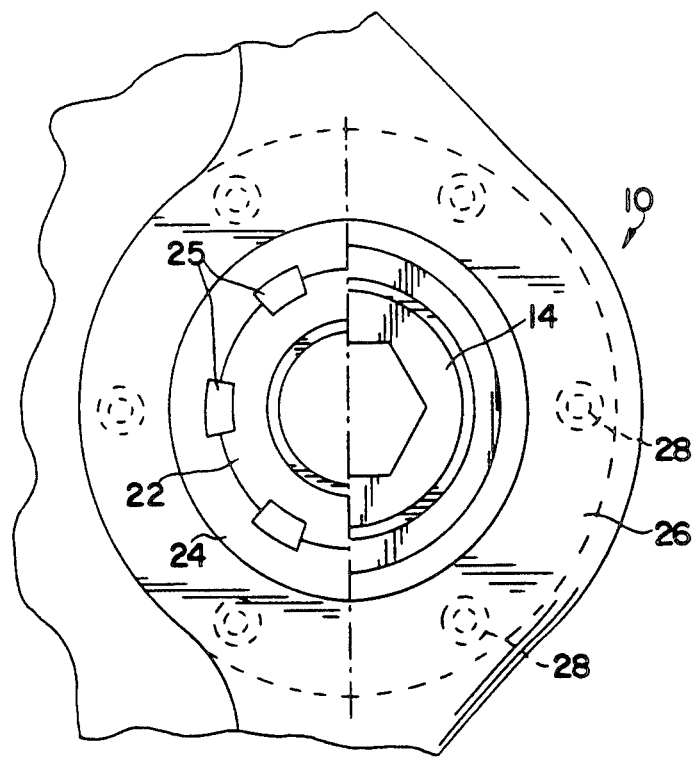
FIG. 2 shows the points of connection between the bush and distributor ring in the direction of arrow Y in FIG. 1.

FIG. 2 shows the bush 18 in the region of its collar 22 after the connection according to the invention of the disc 24. In this process, the collar 22 is partially sunk by plastic deformation in such a way that steps 25 occur in each of these affected areas. The steps serve to press an inner region, lying thereunder, of the disc 24 firmly against the shoulder 20, thus to unite the disc 24 with the bush 18. The result is to achieve, via the inner region of the disc 24, an undetachable connection between the shielding cap 26, produced from electrically conductive plastic, and the bush 18. Owing to the contact pressure communicated via the downforces of the head screws 14, the bush 18 is pressed against the housing, thus producing a grounding between the shielding cap 26, which absorbs electro magnetic radiation, and the chassis. The disc 24, which is constructed so as to be resilient, can easily be deformed by suitable means during assembly with the distributor cap 16, so that tolerances between components can be far.

I claim:

1. An ignition distributor (10) for internal combustion engines comprising a distributor cap (16) of insulating material provided with at least two bushes (18) of electrically conductive material, a shielding cap (26) being provided to cover the distributor cap (16), said shielding cap including at least two perforated discs (24) of conductive material formed therein, each said perforated disc having an external section provided with a plurality of projections (28), axes of which are substantially parallel to an axis of the perforated disc (24), an internal section of each perforated disc (24) being adapted for electrically conducting contact with one bush (18), and including at least two cap screws (14) leading through the buses (18) for jointly fixing the shielding cap (26) and the distributor cap (16) to a grounded housing (12), a head of each cap screw (14) being disposed to press against an end face of the bushes (18) and to hold the bushes via an opposite end face against the housing (12), and contact by each perforated disc (24) with the bush (18) is effected as an undetachable connection of the internal section of the perforated disc (24) with the bus (18) by plastic deformation.

2. The ignition distributor according to claim 1, in which the internal section of the perforated disc (24) abuts against a shoulder (20) disposed in one end of the bush (18) and is fixed therein by deforming material from a portion of the bush (18) to form steps (25) which retain the internal section of the perforated disc against the shoulder (20).

3. The ignition distributor according to claim 1, in which the perforated disc (24) further comprises a flat disc having an inner portion lying in a plane radial to the axis of the bush (18).

4. The ignition distributor according to claim 2, in which the perforated disc (24) further comprises a flat disc having an inner portion lying in a plane radial to the axis of the bush (18).

5. The ignition distributor according to claim 1, in which the plastic deformation is done in a point-like fashion.

* * * * *